US007051281B1

(12) United States Patent
Yokota

(10) Patent No.: US 7,051,281 B1
(45) Date of Patent: May 23, 2006

(54) REMOTELY CONTROLLABLE USER INTERFACE DISPLAY APPARATUS AND METHOD OF CONTROLLING SAME

(75) Inventor: Masahiko Yokota, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/388,373

(22) Filed: Sep. 1, 1999

(30) Foreign Application Priority Data

Sep. 3, 1998 (JP) ............................. 10-250015

(51) Int. Cl.
*G06F 17/21* (2006.01)
(52) U.S. Cl. ........................................ 715/740; 715/746
(58) Field of Classification Search ................ 345/771, 345/773, 840, 970, 717; 700/83; 358/1.15, 358/1.14, 400, 407, 442, 3.28, 744, 740, 358/743; 710/30, 15; 715/740, 734–739, 715/746, 717, 771–773, 466; 707/516, 526
See application file for complete search history.

(56) References Cited

U.S. PATENT DOCUMENTS

| | | | | |
|---|---|---|---|---|
| 5,361,265 A | * | 11/1994 | Weinberger et al. | 714/47 |
| 5,508,821 A | * | 4/1996 | Murata | 358/442 |
| 5,699,494 A | * | 12/1997 | Colbert et al. | 395/114 |
| 5,727,135 A | * | 3/1998 | Webb et al. | 395/113 |
| 5,760,412 A | * | 6/1998 | Yang et al. | 250/559.4 |
| 5,774,678 A | * | 6/1998 | Motoyama | 710/100 |
| 5,886,753 A | * | 3/1999 | Shinyagaito et al. | 725/59 |
| 5,983,247 A | * | 11/1999 | Yamanaka et al. | 715/526 |
| 5,995,712 A | * | 11/1999 | Doi | 395/102 |
| 6,012,072 A | * | 1/2000 | Lucas et al. | 715/526 |
| 6,012,074 A | * | 1/2000 | Lucas et al. | 715/531 |
| 6,091,508 A | * | 7/2000 | Love et al. | 358/1.15 |
| 6,148,241 A | * | 11/2000 | Ludtke et al. | 700/83 |
| 6,151,610 A | * | 11/2000 | Senn et al. | 715/516 |
| 6,226,096 B1 | * | 5/2001 | Ouchi | 358/1.14 |
| 6,615,293 B1 | * | 9/2003 | Shima et al. | 710/30 |
| 6,961,712 B1 | * | 11/2005 | Perkowski | 705/27 |

FOREIGN PATENT DOCUMENTS

| | | |
|---|---|---|
| JP | 9-93381 | 4/1997 |
| JP | 9-288554 | 11/1997 |

OTHER PUBLICATIONS

Canon Fax-L775 Instruction Book, English , Canon Inc. 1992.*

* cited by examiner

*Primary Examiner*—Steven P. Sax
(74) *Attorney, Agent, or Firm*—Fitzpatrick, Cella, Harper & Scinto

(57) ABSTRACT

A remotely controllable apparatus has a control panel for specifying a processing operation and is operated in accordance with an indication from the control panel and/or an externally supplied command. A storage device stores control-panel data that represents the appearance of at least principal components of the control panel. Remote control is performed using a virtual control panel, the appearance of which resembles that of the actual control panel, created by utilizing the control-panel data.

26 Claims, 12 Drawing Sheets

FIG. 3

| | | COORDINATE | COORDINATE OF REFERENCE BUTTON | APPEARANCE DATA | | | | |
|---|---|---|---|---|---|---|---|---|
| 1 | MACHINE MODEL NO. | | | | | | | |
| 2 | BACKGROUND DATA | | | | | | | |
| 3 | DISPLAY-MEANS DATA | COORDINATE | TOUCH-PANEL FUNCTION AVAILABLE? | APPEARANCE DATA | SCREEN DATA | SCREEN DATA 2 | SCREEN DATA 3 | SCREEN DATA 4 |
| 4 | BUTTON DATA 1 | TYPE | TITLE | ORDER | RELATIVE COORDINATES | SIZE | APPEARANCE DATA | |
| 5 | BUTTON DATA 2 | TYPE | TITLE | ORDER | RELATIVE COORDINATES | SIZE | APPEARANCE DATA | |
| 6 | BUTTON DATA 3 | TYPE | TITLE | ORDER | RELATIVE COORDINATES | SIZE | APPEARANCE DATA | |
| 7 | BUTTON DATA 4 | TYPE | TITLE | ORDER | RELATIVE COORDINATES | SIZE | APPEARANCE DATA | |
| 8 | BUTTON DATA 5 | TYPE | TITLE | ORDER | RELATIVE COORDINATES | SIZE | APPEARANCE DATA | |
| 9 | BUTTON DATA 6 | TYPE | TITLE | ORDER | RELATIVE COORDINATES | SIZE | APPEARANCE DATA | |
| 10 | BUTTON DATA 7 | TYPE | TITLE | ORDER | RELATIVE COORDINATES | SIZE | APPEARANCE DATA | |
| 11 | BUTTON DATA 8 | TYPE | TITLE | ORDER | RELATIVE COORDINATES | SIZE | APPEARANCE DATA | |
| 12 | BUTTON DATA 9 | TYPE | TITLE | ORDER | RELATIVE COORDINATES | SIZE | APPEARANCE DATA | |
| 13 | BUTTON DATA 10 | TYPE | TITLE | ORDER | RELATIVE COORDINATES | SIZE | APPEARANCE DATA | |
| 14 | BUTTON DATA 11 | TYPE | TITLE | ORDER | RELATIVE COORDINATES | SIZE | APPEARANCE DATA | |

FIG. 4

| | D1 | D2 | D3 | D4 | D5 |
|---|---|---|---|---|---|
| | BUTTON TYPE | DATA | RELATIVE POSITION (X) | RELATIVE POSITION (Y) | RELATIVE POSITION (X) |
| | START | 01 | 00 | 00 | 00 |
| | STOP | 02 | 05 | 05 | F6 |
| | * | 03 | F0 | F8 | E2 |
| | # | 04 | EE | F8 | E2 |
| | 0 | 05 | EC | F8 | E2 |
| | 1 | 06 | EA | 20 | E2 |
| | . | | | | |
| | . | | | | |
| | . | | | | |
| | POLLING | 065 | 5C | 18 | FC |
| | CONFIDENTIAL | 066 | 54 | 18 | FC |
| | . | | | | |
| | . | | | | |
| | SINGLE-BUTTON DIALING 1 | D5 | 7C | 18 | FC |
| | SINGLE-BUTTON DIALING 2 | D6 | 74 | 18 | FC |
| | . | | | | |
| | . | | | | |
| | . | | | | |

REMOTELY CONTROLLABLE USER INTERFACE DISPLAY APPARATUS AND METHOD OF CONTROLLING SAME

BACKGROUND OF THE INVENTION

This invention relates to a user interface display apparatus for operating, e.g., an image processing apparatus, and to a method of operating the image processing apparatus, for the purpose of enhancing operability.

In an information processing apparatus such as a personal computer (referred to as a "PC" below), an image processing apparatus such as a printer or facsimile machine connected to the PC and application software (referred to simply as an "application" below) for operating the image processing apparatus are used to display a user interface on the PC. The user interface on the PC is operated to utilize the functions of the image processing apparatus. In a typical example of such an arrangement, binary or text data that has been stored in a storage device, e.g., a memory or a hard disk drive (HDD) within the PC can be transmitted by the connected facsimile machine using a facsimile application, and data that has been received by the facsimile machine can be displayed on a display device, which has been connected to the PC, using the facsimile application.

Image data to be transmitted for facsimile purposes can also be entered from an image scanner or the like connected to the PC. In this case the procedure involves the user loading the document in the image scanner, launching the image reading application to read the image from the document, storing the read image data temporarily on a storage device within the PC (or in an external storage device accessible from the PC) and then launching the facsimile application to transmit the image data.

Similarly, in a case where a document copying operation is performed using an image scanner and a printer that are connected to a PC, the procedure followed involves the user launching a copying application to read the image of the document, input the image to the PC and then output the image from the PC to the printer, as described in the specification of Japanese Patent Application Laid-Open (KOKAI) No. 9-288554, by way of example. On the other hand, an embodiment in which the fact that a document has been placed in a scanner is sensed, in response to which the document is read, is described in the specification of Japanese Patent Application Laid-Open No. 9-93381.

However, in a case where the image processing apparatus connected to the PC in the examples of the prior art mentioned above is an apparatus capable of being used especially as a stand-alone device, i.e., in a case where the apparatus is a copier or facsimile machine, the control panel provided on the image processing apparatus so that it may be used in stand-alone fashion and the image which the PC displays on the display device when data is sent and received are completely different.

For example, a command for implementing a function which is a button on the control panel of a facsimile machine is displayed only as characters on the display device of the PC. Even if the command is displayed graphically, the design and placement of the graphic display differ entirely from the button on the control panel. As a consequence, this approach does not allow one to intuit, in terms of appearance, the association between the display and the control panel of the actual facsimile machine.

Thus, the control panel possessed by the image processing apparatus itself and the control-panel display presented on the PC connected to this image processing apparatus are visually quite different from each other and there is no clear association between the display and the actual apparatus. This leads to inconveniences. For example, consider a case where the method of operation used when making a transmission differs depending upon whether the information medium is tangible (information on paper) or intangible (electronic information), as when information that has been written on paper is transmitted by operating a facsimile machine or when electronic data, such as a word-processed document or an image created by a PC, is transmitted from the PC by operating the facsimile machine. In such case the operation performed at the actual apparatus (the facsimile machine) and the operation performed at the PC are different despite the fact that the same apparatus is operated. This not only makes it necessary to remember both methods of operation but also is a cause of erroneous operation.

As another example, consider a case where a plurality of types of image processing apparatus having the same functions are capable of being utilized by a PC. In this case also the PC displays only the same operating screen, making it difficult for the operator to tell which image processing apparatus is being instructed to perform processing. For example, in a situation where both a color copier and a black-and-white copier are capable of being used, the operator selects the particular output destination depending upon the type of document that is to be output. With the prior art, however, the screen display presented by the PC does not differ that much, the display differing in terms of the model number of the image processing apparatus at best. This makes it easy for the operator to perform an erroneous operation, such as accidentally instructing that a color document be output to the black-and-white copier.

Similarly, consider application software run by the PC to utilize a remote image processing apparatus. The screen display and the method of operation differ for each application, and even if the application is the same, version updates can require a change in the method of operation. As a result, the environment to which the operator has grown accustomed must be altered on each occasion.

Further, in a case where an image that has been entered from an image input apparatus connected to the PC is to be transmitted for facsimile purposes or copied, the operation for reading the document must be performed after first launching not only the facsimile-transmission application and copying application but also the application that is for reading the image. If the PC has not been started up or has been placed in a power conserving mode, for example, the user must perform all of the above-mentioned operations, from activation of the PC to launching of the applications. This is a more troublesome and time-consuming operation than what would be entailed by using the devices such as the facsimile machine and copier in stand-alone fashion.

SUMMARY OF THE INVENTION

Accordingly, an object of the present invention is to provide a remotely controllable apparatus and remote control method in which there is little disparity between a case where the apparatus is controlled using a control panel possessed by the apparatus itself and a case where the apparatus is controlled remotely from a PC or the like, thereby facilitating control of the apparatus.

Another object of the present invention is to provide a method of remotely controlling a remotely controllable apparatus in which operability is enhanced when remotely controlling a data processing apparatus from a PC.

A further object of the present invention is to enhance convenience when transmitting or outputting the image of a document utilizing an image input device and a remotely controllable apparatus connected to a PC.

Specifically, according to one aspect of the present invention, there is provided a remotely controllable apparatus which has a control panel for specifying a processing operation and which is operated in accordance with an indication from the control panel and/or an externally supplied command, characterized in that the apparatus has storage means for storing control-panel data representing an external appearance of at least principal portions of the control panel.

According to another aspect of the present invention, there is provided a remote control method for controlling a remotely controllable apparatus from an external device connected to the remotely controllable apparatus, wherein the apparatus has a control panel for specifying a processing operation and which is operated in accordance with an indication from the control panel and/or an externally supplied command, the method comprising the steps of: displaying, on the external device, a virtual control panel having an appearance identical with or similar to at least part of the control panel; designating a desired position on the virtual control panel; generating a command of the remotely controllable apparatus corresponding to the position designated on the virtual control panel; and supplying the generated command to the remotely controllable apparatus.

According to still another aspect of the present invention, there is provided a remote control system comprising: a remotely controllable apparatus which has a control panel for specifying a processing operation and which is operated in accordance with an indication from the control panel and/or an externally supplied command; an information processing apparatus capable of supplying a command to the remotely controllable apparatus; and a display unit and input device connected to the information processing apparatus, wherein the information processing apparatus includes: display means for displaying, on the display unit, a virtual control panel having an appearance identical with or similar to at least part of the control panel; discriminating means for associating a command, which operation of the control panel causes to be applied to the remotely controllable apparatus, and an operation performed on the virtual control panel; and communication means for supplying the remotely controllable apparatus with a command that corresponds to an operation performed on the virtual control panel.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 3 is a diagram showing an example of the structure of control-panel data;

FIG. 4 is a diagram showing the structure of simplified control-panel data and an example of the data;

DESCRIPTION OF THE PREFERRED EMBODIMENTS

The present invention will now be described in detail with reference to the drawings. Though the following embodiment is described in regard to an example in which a copier (referred to as a "fax/copier" below) having a facsimile function is used as an apparatus to be controlled by the user, the present invention is applicable in other types of image processing apparatus as well.

Embodiment

Figure 1:
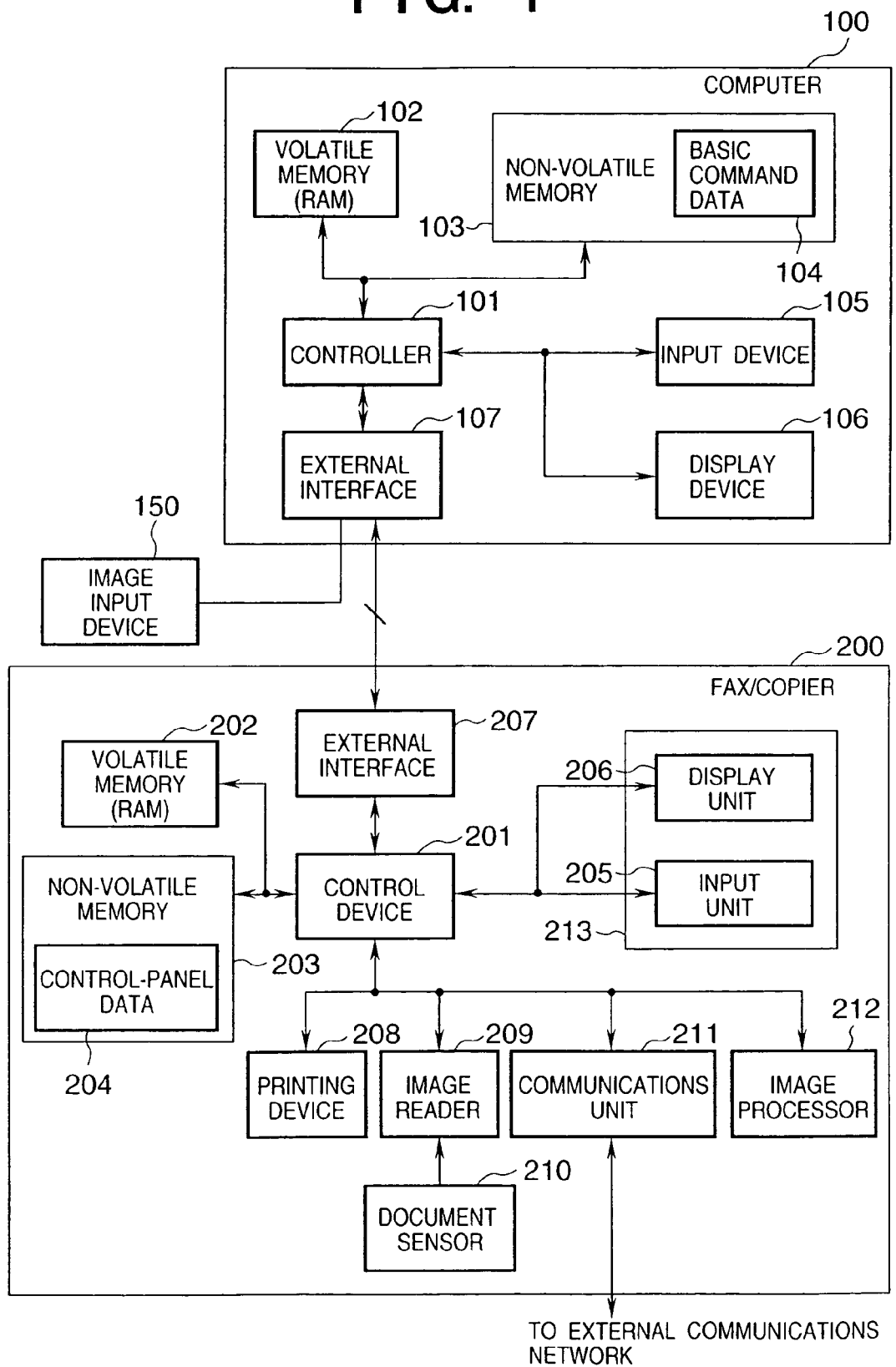
FIG. 1 is a block diagram illustrating an embodiment of the present invention.
Figure 2:
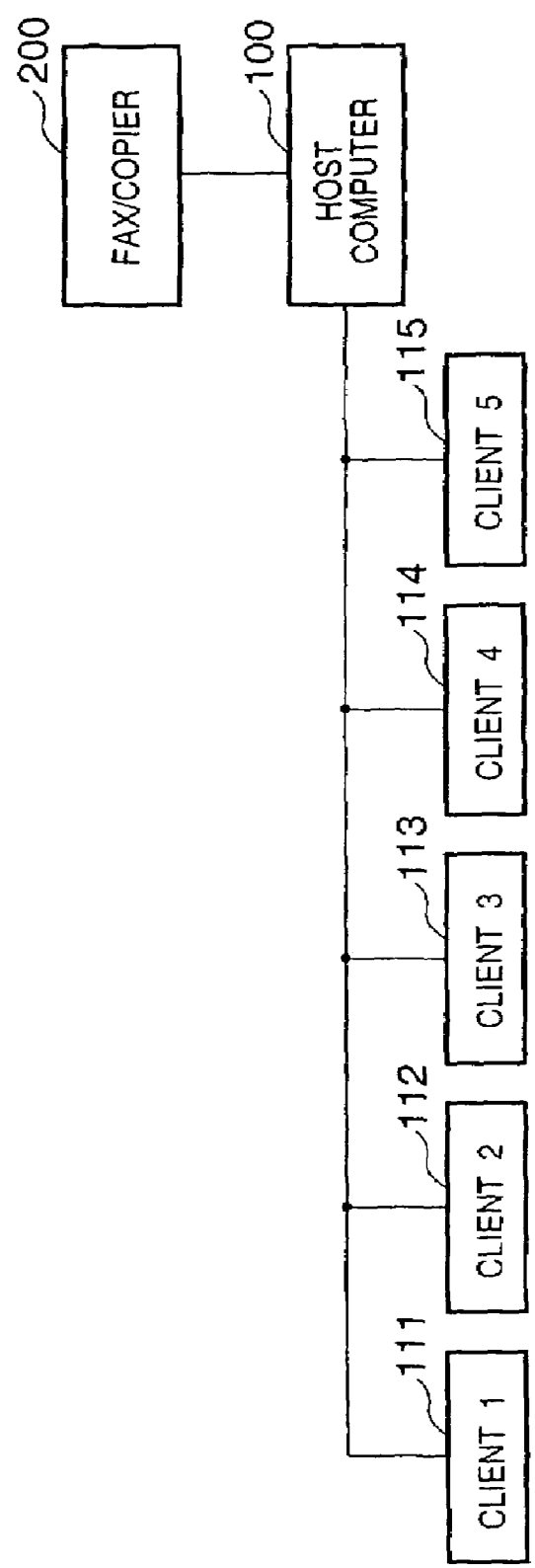
FIG. 2 is a diagram showing an example of a connection using a host computer.

FIG. 1 is a block diagram illustrating an embodiment of the present invention. The embodiment includes a computer 100 which, depending upon the form of connection, is capable of being used as a host computer and as a client computer. FIG. 2 illustrates an example in which five client computers 111 to 115 have been connected to a fax/copier 200 via the computer 100 serving as a host computer. The computers 100 and 111 to 115 in FIG. 2 are capable of being implemented by identical architectures. The computer 100 serving as the host computer may also be used as a fax server. In such case the host computer 100 would be capable of extracting data received by the fax/copier 200 and of distributing this data to the client computers 111–115 in conformity with subaddresses. On the client side the clients would be able to search in the host computer and retrieve the data.

Provided in the host computer 100 are a controller 101, a volatile memory 102, such as a RAM, which is not backed up by a power supply, a non-volatile memory 103 such as a ROM, hard-disk drive or floppy disk, an input device 105 such as a keyboard and mouse, a display device 106 such as a CRT display or liquid crystal display, and an external interface 107.

The controller 101, which includes interfaces for the CPU, input device 105 and display device 106, controls the overall computer 100.

The external interface 107, such as a serial/parallel interface or network interface, is for effecting a connection to an external device or network. More specifically, the external interface 107 may having several interfaces of various types, such as an RS-232C, Centronics interface, USB, SCSI, IEEE-1394 interface, IrDA, etc. In this embodiment, an image input device 150 such as a scanner is connected to the host computer 100 via the external interface 107 in addition to the fax/copier 200.

The non-volatile memory 103 is internally provided with an area (basic-command-data area 104) for storing information concerning the control panel of a remotely controlled device, as will be described later.

The fax/copier 200 can be just a facsimile machine or a copier having a facsimile function (a facsimile machine constructed around a printer or copier). The fax/copier 200 is provided with a controller 201, a volatile memory 202, a non-volatile memory 203, a control panel 213, a printing device 208, an image reader 209, a communications unit 211 and an image processor 212.

The controller 201 is connected to each of the components of the fax/copier 200 and exercises overall control such as operation of the fax/copier 200 and communication with an external device. The control panel 213 has an input device 205 and a display unit 206. The display unit 206 is a liquid crystal panel provided on the control panel, and the input device 205 comprises hardware-type keys and buttons likewise provided on the control panel or a touch-sensitive panel superimposed on the display unit.

The printing device 208 is a printer such as a laser printer or ink-jet printer. The image reader 209 is capable of employing a CCD or contact-type image sensor. The communications unit 211 comprises, e.g., a modem and NCU and is for communicating with an external communications network. The image processor 212 comprises a gate array for converting an analog image signal read by the image reader 209 to digital data and subjecting the data to binarization processing, error-diffusion processing and encoding. In addition, the image processor 212 decodes a code signal received by the communication unit 211. The image signal obtained by decoding is printed on a printing medium by the printing device 208.

In a case where a laser printer is used as the printing device 208, the latter has a semiconductor laser and its controller, a polygon motor and its controller, an f-θ lens, an optical-path altering mirror, an OPC photosensitive drum and drum driving unit, toner, a toner stirring unit, toner supply unit and its controller, a photosensitive-drum charging unit and its controller, a toner transfer unit, a photosensitive-drum cleaning unit and its controller, an image fixing unit and its controller. As these components are of the ordinary type, however, they are not described here in detail.

The volatile memory 202 and non-volatile memory 203 in the fax/copier 200 can be constructed in a manner similar to the corresponding memories in the host computer 100. The non-volatile memory 203 has an internally provided control-panel data area for storing control-panel data 204 which includes the appearance of the control panel 213 and commands that correspond to the input device 205. This data is capable of being transmitted to the host computer 100 via the controller 201 and an external interface 207 or to a client computer on a network. The structure of the control-panel data 204 will now be described.

Data Structure

FIG. 3 is a diagram showing an example of the structure of the control-panel data 204. This example of the data structure illustrates a case where the control panel has a display unit and is provided with 11 buttons (keys). Data 1 is machine model number serving as ID data for identifying the model, and data 2 is background data indicative of the background of the control panel. In order to more closely approximate the appearance of the control panel, data relating to the background of the control panel is used as necessary. The background data is composed of a series of coordinates the origin whereof is the lower left-hand corner. For example, the data includes coordinate data indicating the position of a background border, coordinates of a reference button (e.g., a start button) used to determine the layout of buttons, and appearance data representing background color and design.

Data 3 is display-means data. This comprises coordinate data indicating a position residing on the display unit, a flag indicating whether or not the display unit has a touch-sensitive panel function, appearance data representing color and design of the display unit, and screen data (for four screens in this example) used in a case where the screen displayed on the display unit is changed by a command (i.e., in a case where a different instruction screen is displayed when a prescribed position on the display unit is designated).

Data 4 to 14 is data relating to buttons (keys) possessed by the control panel. Each item of this data is composed of a flag indicating whether the type is button or touch-sensitive panel; a title representing a functional explanation, such as "SET" or "CLEAR", indicated above or below the button on the control panel; the command that is generated when the button is pressed; relative coordinates of this button with respect to the reference button; button size (e.g., length of the size of the smallest square that contains the button); and appearance data representing the button color and design.

Said command can include setting or registration operation, as well as, operation data for fax/copier 200, as a computer macro. For example, the command consists of address setting operation to auto-dial button or speed dialing, copy condition setting (reduction/enlargement ratio, 2-sided copying, two-page separation, etc) and operational data (perform copying, etc.) of a fax/copier 200. This macro command can be assigned to a desired button.

In a case where background data and display-means data is not used and appearance data relating to each button can be prepared on the side of the computer 100, the amount and types of data transmitted can be reduced. FIG. 4 illustrates the structure of simplified control-panel data and example of the data.

In FIG. 4, column D1 contains the names of control-panel buttons, and column D2 contains button-type data which has one-to-one correspondence with the data in column D1 and is indicated by a two-digit hexadecimal number. Columns D3 and D4 indicate the relative positions of the buttons, and column D5 indicates the relative sizes of the buttons. In this embodiment, the relative position and relative size of the start button serve as references, and the relative positions and relative sizes of the other buttons are indicated by two-digit hexadecimal numbers.

Figure 5:
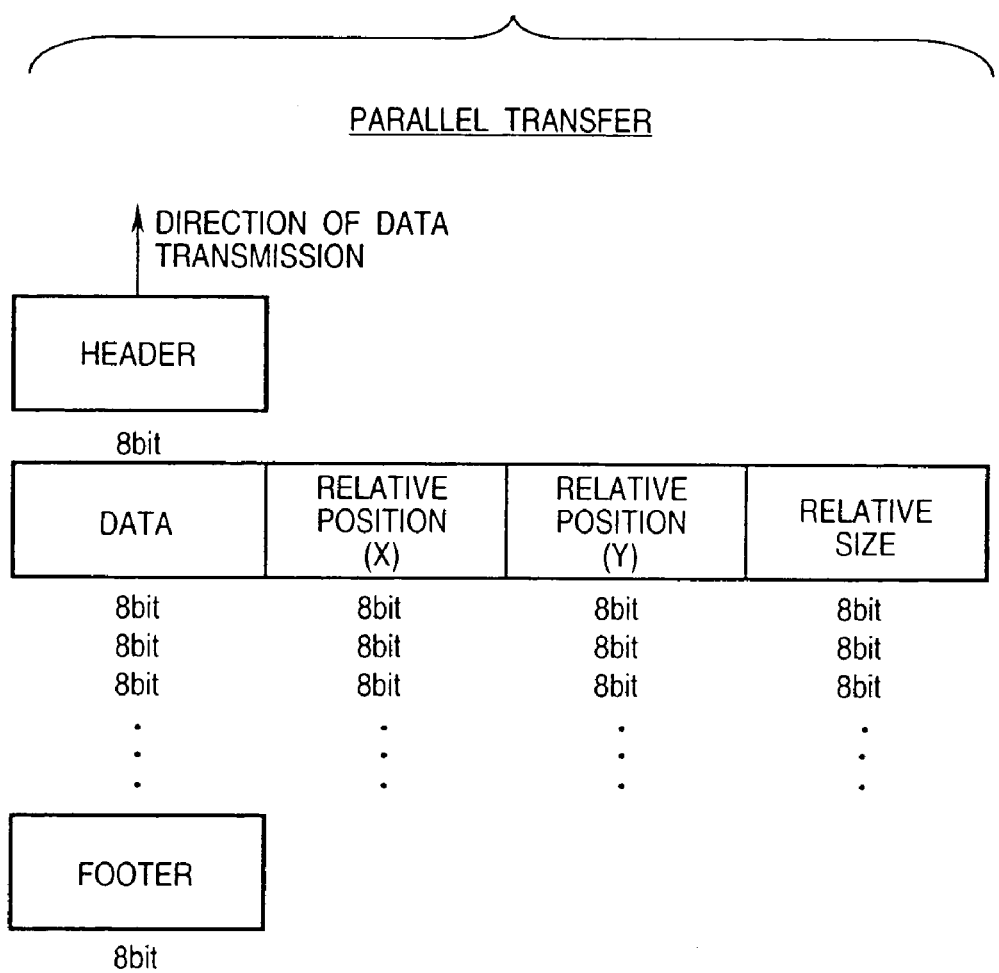
FIG. 5 is a diagram showing an example of the transfer format of control-panel data.

Transfer of this control-panel data can be implemented by any method. For example, in a case where the control-panel data having the structure shown in FIG. 4 is transferred using a parallel interface capable of transferring 32 bits, a total of 32 bits representing the button-type data, relative positions X, Y and relative size are sent as one block after a header is transmitted, as illustrated in FIG. 5. After the blocks of all button-type data have been sent, a footer is appended and sent, thereby completing the transfer. Depending upon the width of the interface, blocks may be split and a checksum may be provided for each block. Further, the data may be sent by a serial interface. It is also possible to send the block singly in response to a transmission request from the computer side.

Further, in a case where the computer 100 is capable of preparing all of the control-panel data necessary for each machine model from machines in addition to the fax/copier 200, as described later, it will suffice if the control-panel data 204 is merely data indicative of the model.

Registration Operation

Described next will be a registration operation performed by the computer 100 which remotely controls the fax/copier 200. The registration operation is one in which the computer 100 creates a virtual control panel of the remotely controllable apparatus and stores the virtual control panel in the non-volatile memory of the computer 100. Once the virtual control panel has been stored in memory, processing for displaying the virtual control panel can be executed the next time by the computer 100 alone. This raises processing speed.

Figure 6:
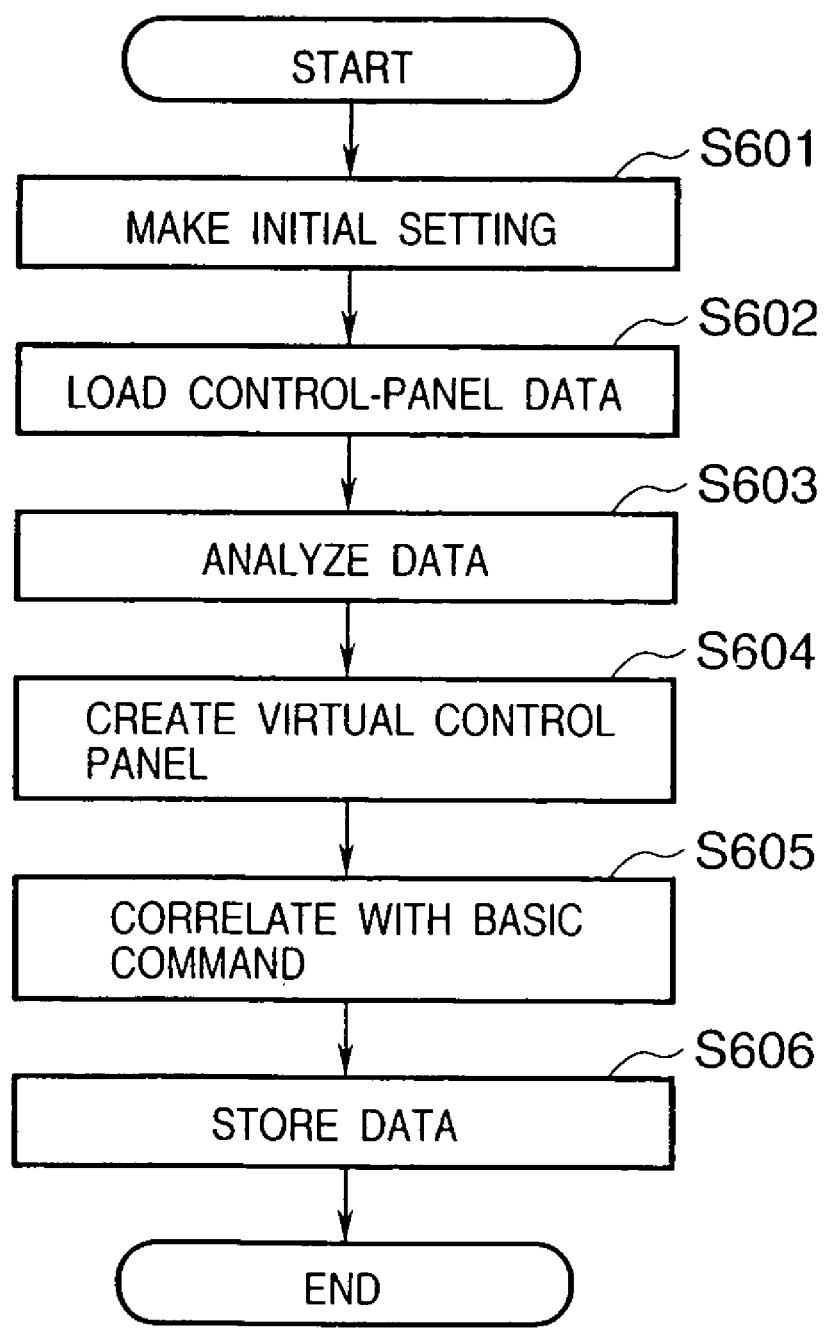
FIG. 6 is a flowchart showing a registration operation of a computer.

FIG. 6 is a flowchart illustrating the registration operation performed by the computer 100. The first step is to make initial settings, such as initializing communication with the fax/copier 200 (S601). Next, control-panel data that has been read out of the area 204 in the non-volatile memory 203 of fax/copier 200 is loaded into the volatile memory 102 or erasable non-volatile memory 103 (S602). The loaded control-panel data is analyzed (S603) and, when necessary, a virtual control panel is created using data stored beforehand in the non-volatile memory (S604). Correspondence is then established between position information concerning the virtual control panel and basic command data that has been stored in the basic-command-data area 104 of non-volatile memory 103 (S605), and the correspondence data is stored in the volatile memory 102 or non-volatile memory 103 (S606).

In a case where a virtual control panel for each model and the correspondence data indicative of correspondence between the coordinates on the image and the basic commands for each model are present as a library in the external storage device or non-volatile memory, etc., the data necessary at the time of the registration operation need be only information that can identify the control panel, such as the model name of the fax/copier 200, as mentioned above. Further, if it is possible for information that can identify the control panel to be entered directly from the input device of the computer 100, the registration operation can be concluded by the computer 100 alone.

The library of control-panel data may be recorded collectively on so-called removable media such as a CD-ROM or magneto-optic disk or stored on an external storage device that is accessible from the computer 100. By way of example, the computer 100 searches the library on the basis of data such as the machine name entered from the input device and downloads the necessary data to a memory device of the computer 100.

Remote Control

Figure 7:
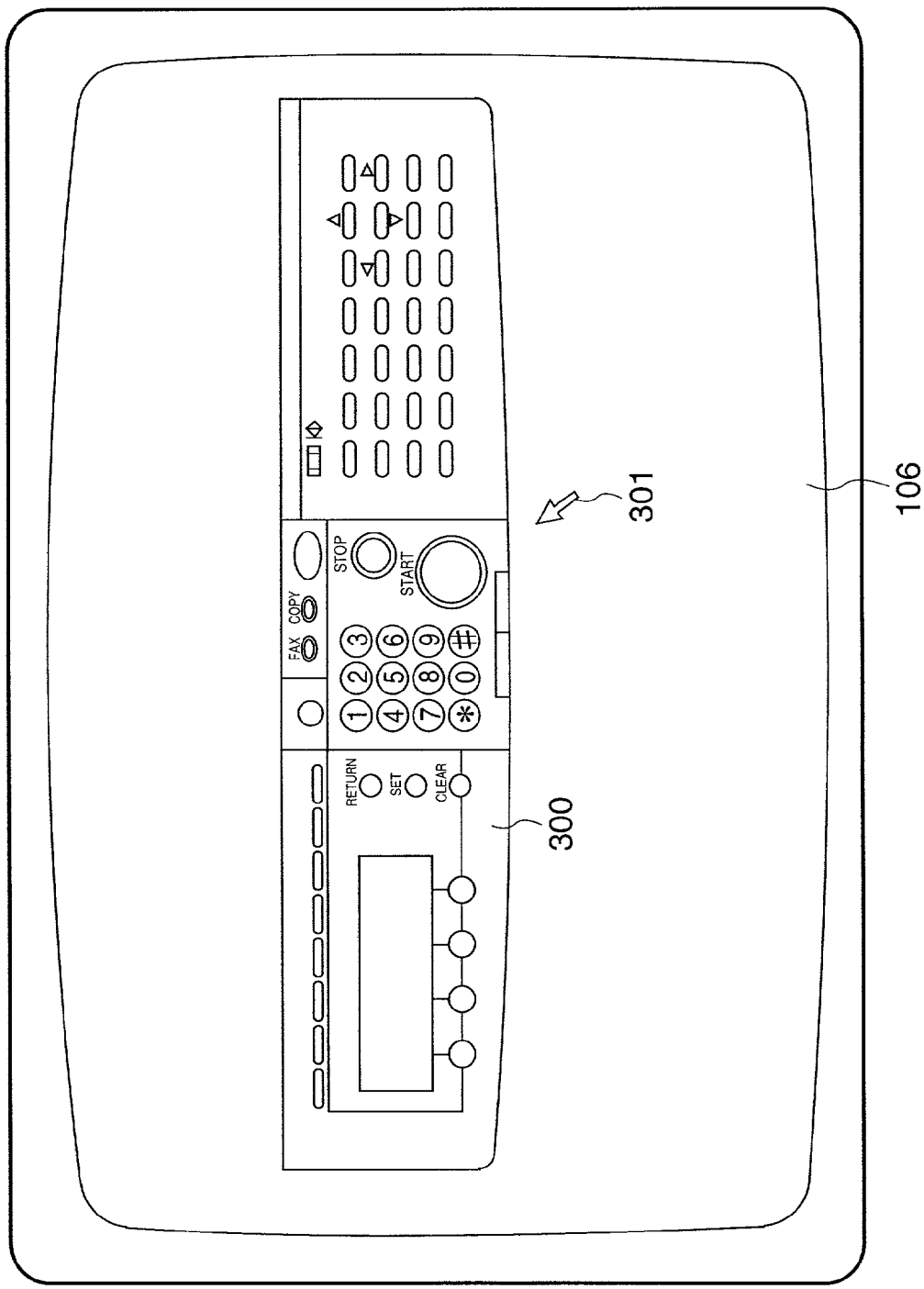
FIG. 7 is a diagram showing an example of a virtual control panel displayed on a display unit.

The operation of the computer 100 when it carries out remote control will now be described. In a case where a document that has been created by the computer 100 is faxed by the fax/copier 200, the virtual control panel of the fax/copier registered in advance by the above-described registration operation is displayed on the display device 106. FIG. 7 illustrates an example of a virtual control panel 300 displayed on the display device 106. FIG. 7 illustrates an example in which the virtual control panel is displayed over the entire display area of the display device. However, an image of reduced size may be displayed near and edge portion, etc., of the display area.

Remote control is carried out by operating the virtual control panel as if it were the control panel of the actual machine. More specifically, by using a pointing device such as a mouse or tablet as the input device 105, a pointer 301 is moved over a button and clicked, or, in a case where a touch-sensitive panel is used as the input device, a position on the touch-sensitive panel corresponding to the button is pressed. In a case where a pointing device is not used, a desired key on the keyboard may be selected.

The basic command that corresponds to the position information designated by the input device is transmitted to the fax/copier 200. For example, when a button representing a dial number 0 is clicked on the display device 106 (see FIG. 7), the corresponding control-panel command data is sent to the fax/copier 200, thereby issuing a command identical with that which would be obtained by pressing the "0" key on the control panel 213 of the fax/copier 200.

If the transmission of commands is performed sequentially as opposed to transmission by pressing buttons one at a time, as described above, the commands may be transmitted to the fax/copier 200 collectively after all of the desired buttons have been pressed. Further, image processing at the time of a fax transmission may be executed in software fashion on the side of computer 100 or by the image processor 212 within the fax/copier 200.

Whether a command specified using the virtual control panel is reflected in the display area of the virtual control panel is optional. Though it would be desirable in terms of operability to reflect an operation performed on the virtual control panel in the display area of panel, this would increase the amount of control-panel data and increase the processing load relating to the virtual control panel. Accordingly, the choice should be made taking into consideration the processing capability of the computer 100.

Further, it is not always necessary to imitate the appearance of the entire control panel of the actual machine. Only portions that are used frequently may be given an appearance close to that of the actual control panel, and display of buttons that are not used very often may be eliminated or may be replaced by images used commonly in all machine models.

Furthermore, by so arranging it that the status of the fax/copier 200 is capable of being received at the time of remote control, the display of the virtual control panel can be altered based upon the status information received. For example, in a case where a warning lamp (tally lamp) provided on the control panel 213 of the fax/copier lights, it is possible to change the display color of the tally lamp on the virtual control panel using the received status. More specifically, an arrangement may be adopted in which the fax/copier 200 notifies the computer 100 of its status periodically when it is operated by remote control, and in which the computer 100 interprets the received status information and controls the display of the virtual control panel accordingly.

Transmission of Document from Fax/Copier

Figure 8:
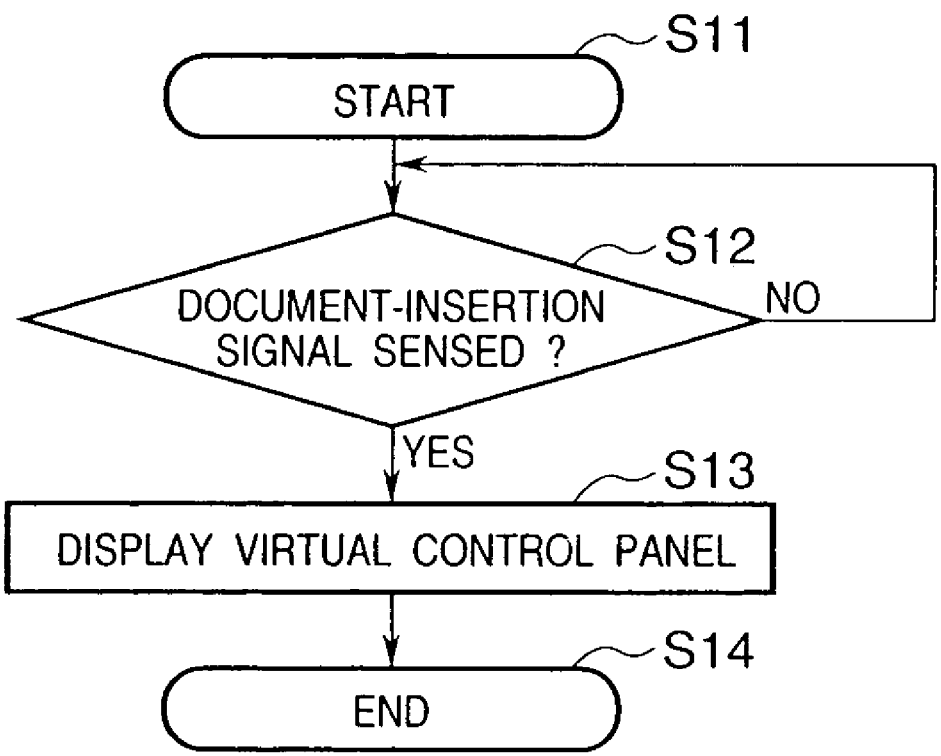
FIG. 8 is a flowchart illustrating the operation of the computer when a document to be transmitted has been placed on a facsimile/copier.

The operation of the computer 100 when a document is transmitted using the fax/copier 200 will be described with reference to FIG. 8. FIG. 8 is a flowchart illustrating the operation of the computer 100 when a document to be transmitted has been placed on the fax/copier 200.

The fax/copier 200 has an document sensor 210 (see FIG. 1) constituted by, e.g., a photointerrupter, that is capable of sensing insertion of the document to be transmitted. The arrangement is such that when insertion of the document is sensed, the document sensor 210 sends the computer 100 a document-insertion signal indicative of the fact.

The computer 100 monitors signals from the external interface 107 constantly. If the controller 101 senses the document-insertion signal ("YES" at S12), then the controller 101 causes the virtual control panel to be displayed on the display device 106 based upon the information in the non-volatile memory 103 (S13). In a case where the corresponding data has not been registered in the non-volatile memory 103, the registration operation described earlier is carried out or use is made of data that has already been prepared in an external storage device.

Thus, remote control for setting reading conditions, indicating the start of reading and inputting the destination, etc., can be performed by the computer 100 immediately merely by inserting the document into the fax/copier 200. By remotely controlling the fax/copier 200 from the computer 100, image data obtained by reading a document to be transmitted can be transmitted as an attachment to a word-processed document created in advance, thereby making unnecessary the conventional operation of importing the image to the word-processed document.

Fax Transmission Using Image Input Device

The virtual control panel can be displayed automatically by similar processing when image data that has been entered using the input device 105 connected to the host computer 100 is to be faxed using the fax/copier 200.

Specifically, by adopting an arrangement in which when the input device 105 has sensed that a document is present on its platen or in its document feeder, the unit sends the computer 100 a signal indicating the presence of the document. This makes it possible to display the virtual control panel automatically in a manner similar to that when the fax/copier 200 is used.

Customizing the Virtual Control Panel

The present invention is characterized in that the appearance of the virtual control panel is made to resemble the control panel of an actual machine. However, the invention also allows the layout of buttons or the like on the virtual control panel to be altered in accordance with user preference. An embodiment for a case where editing of the virtual control panel is performed will be described with reference to FIGS. 9 and 10.

Figure 9:
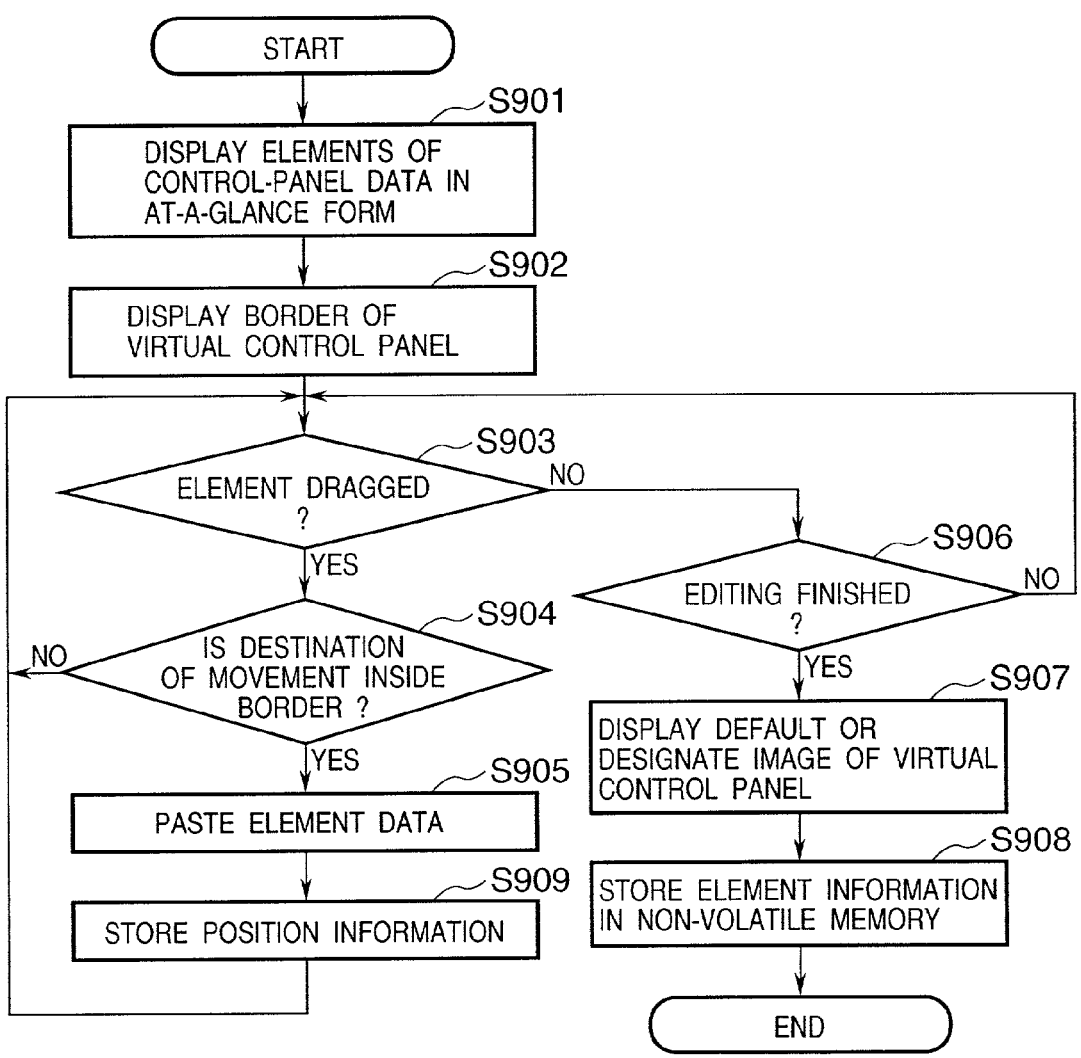
FIG. 9 is a flowchart illustrating editing of the virtual control panel performed by the computer.
Figure 10:
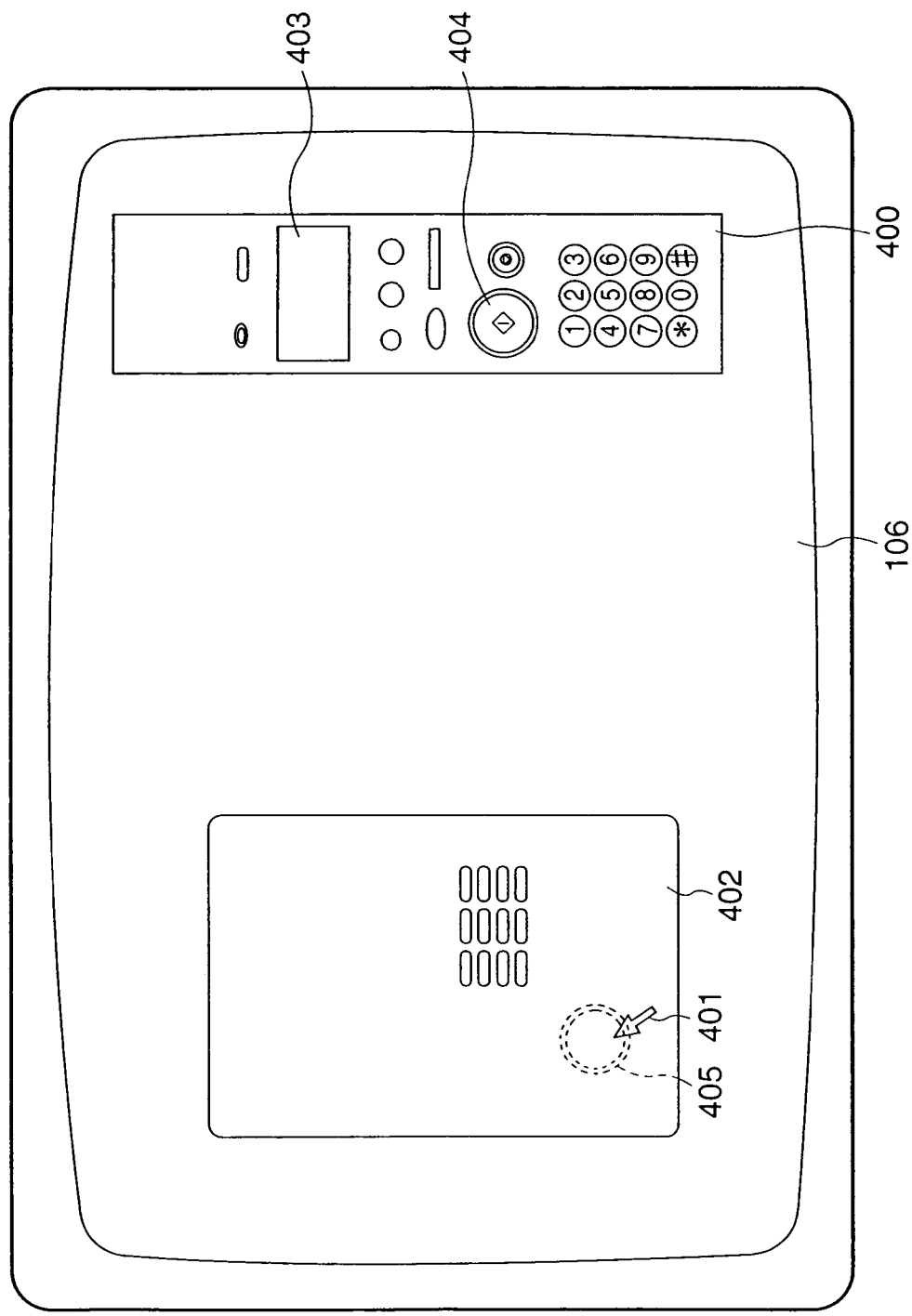
FIG. 10 illustrates an example of an editing screen for editing the virtual control panel.

FIG. 9 is a flowchart illustrating editing of the virtual control panel performed by the computer 100, and FIG. 10 illustrates an example of an editing screen for editing the virtual control panel.

When the virtual control panel is edited, first the position information contained in the control-panel data is ignored and the various control-panel elements are displayed in at-a-glance form (S901). In this embodiment, the elements are displayed collectively on the right side of the screen of the display device 106 (see numeral 400 in FIG. 10). Displayed in the at-a-glance grouping 400 of elements are a display area 403, a start button 404 and an at-a-glance grouping of operating keys necessary for operating the fax/copier 200. As described earlier, these control buttons have one-to-one correspondence with the items of basic command data 104 of the fax/copier 200. For example, in a case where the control button 404 which indicates the appearance of the start button is operated, a command is transmitted from the computer to the fax/copier so as to furnish an operating effect identical with that which would be obtained by operating the start button located on the control panel of the fax/copier.

Next, the border of a virtual control panel 402 is displayed (S902). This indicates the limits of the virtual control panel after editing and allows the user to grasp positional relationships when buttons are laid out. Though the size of the border may be fixed or made variable, it is preferred that a limit be set if the border size is made variable.

The editing of the virtual control panel 402 can be performed by using a pointing device such as a mouse as an input device, and dragging desired elements, which are displayed in the at-a-glance grouping 400 of elements, to desired positions within the border of the virtual control panel 402 using a pointer 401, thereby placing the desired elements at the desired positions. FIG. 10 shows the button 404 being dragged into the virtual control panel 402 so as to be placed there as a button 405.

If an element such as a button is dragged from the at-a-glance grouping 400 of elements ("YES" at S903) and the destination of this movement is within the border of the virtual control panel 402 ("YES" at S904), then the computer 100 pastes the dragged element within the border (S905) and stores the position information in the volatile memory temporarily (S909).

If the end of editing is specified by designating an edit end button (not shown) during editing ("YES" at step S906), a designation is made as to whether priority should be given to use of the original virtual control panel or the virtual control panel that has been edited (S907). This designating information as well as the control-panel element information that has been stored temporarily in the volatile memory is stored in a prescribed area of the non-volatile memory (S908), after which editing processing is terminated.

Creation of Virtual Control Panel on Per-User Basis, and Utilization of Virtual Control Panels In the example set forth above, only one virtual control panel can be edited per computer. However, in order to deal with occasions where one computer is shared by a plurality of individuals, it is possible to adopt an arrangement in which a different virtual control panel is constructed for each individual user.

Figure 11:
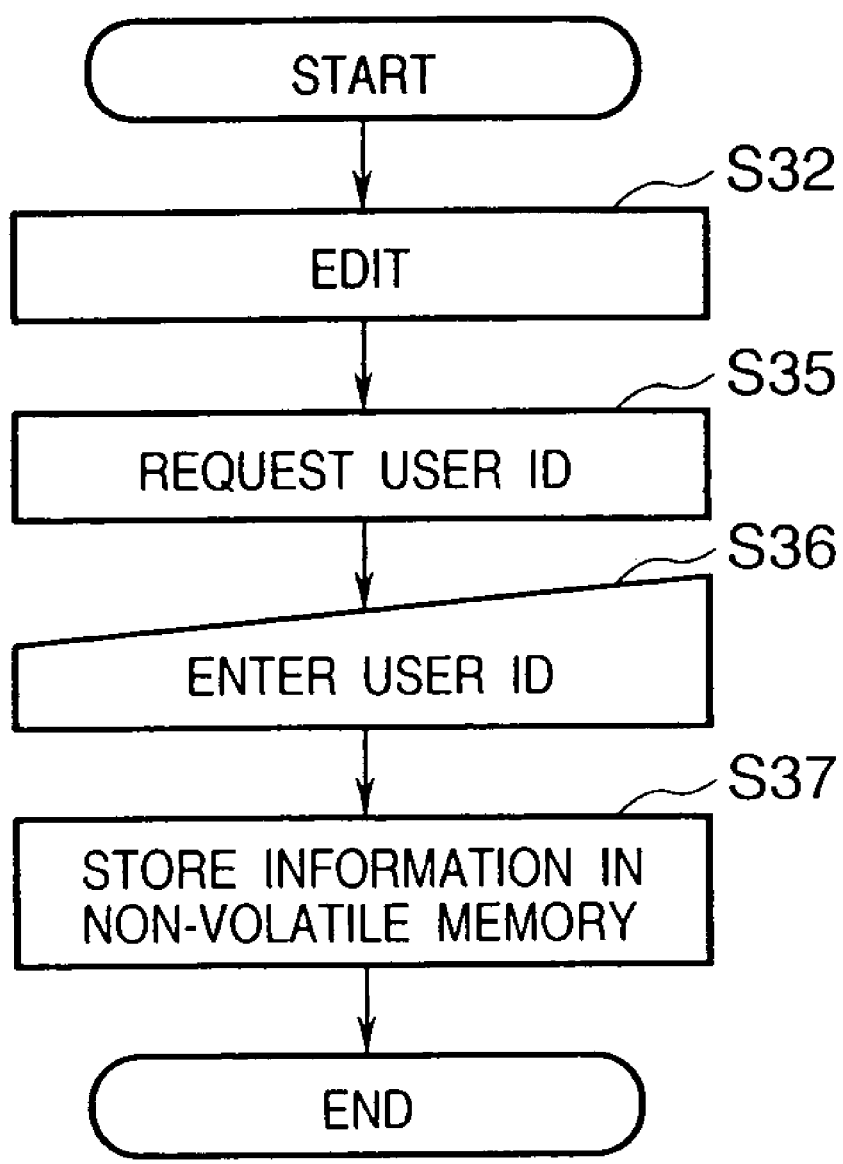
FIG. 11 is a flowchart illustrating an example of operation for generating a virtual control panel for each user.

FIG. 11 illustrates an operation for generating a virtual control panel for each user. The editing of the virtual control panel may be the same as the operation shown in FIG. 9, and the steps S901 to S908 in FIG. 9 are executed as an editing routine (S32). When editing ends, the user is prompted to enter a unique number such as a user ID (S35). When entry of the user ID ends (S36), correspondence with the edited control-panel data is established and the information is stored in the non-volatile memory (S37).

These items of data may be stored in a storage device of the host computer 100 or in a storage device of the fax/copier 200. In the latter case, it will be possible for a user to use his or her own edited virtual control panel at any computer that is capable of remotely controlling the fax/copier 200. On the hand, since all of the data will be concentrated in the fax/copier 200 in this case, a problem relating to storage capacity arises. Accordingly, where the data should be stored is decided upon taking these factors into consideration.

Figure 12:
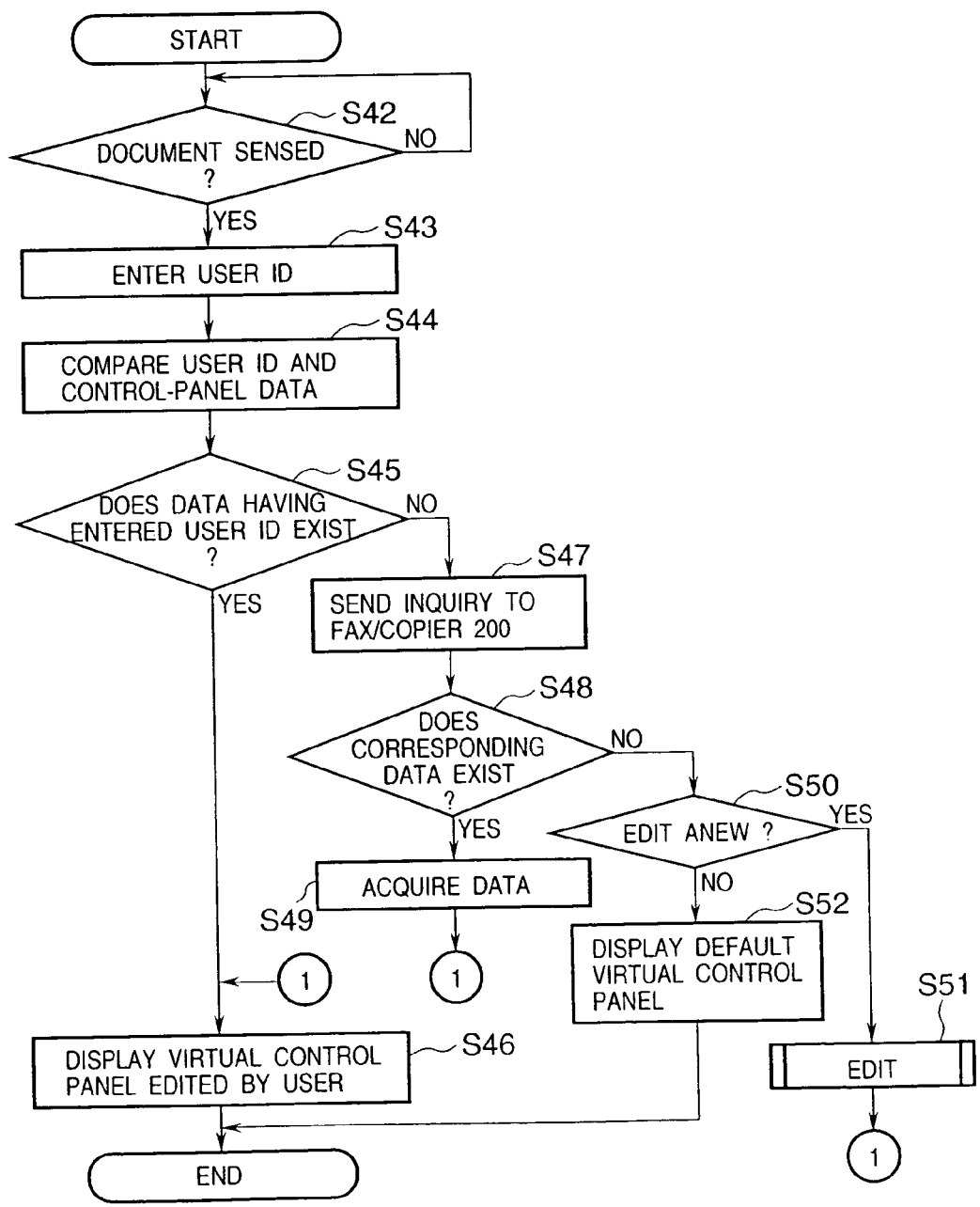
FIG. 12 is a flowchart illustrating operation when a copier is remotely controlled using a virtual control panel that has been edited by the user.

An operation in which the fax/copier 200 is remotely controlled using a virtual control panel that the user him/herself has edited will be described with reference to FIG. 12. FIG. 12 is a flowchart useful in describing a case where the user has inserted a document for transmission into the image input device 105 or into the document feeder of the fax/copier 200. When the presence of the document is sensed by the controller 101 of the host computer 100 in response to the document-insertion signal ("YES" at S42), the computer 100 compares a user ID, which has been entered at step S43 requesting input of the user ID, with data that has been stored in the non-volatile memory, and determines whether the corresponding virtual control panel has been stored (S44). If the corresponding data exists ("YES" at S45), then the computer displays the virtual control panel that has been edited by the user (S46). Thereafter, on the basis of commands entered from the displayed virtual control panel, the user sets the document reading conditions, indicates start of the document reading operation and commands processing of the read image, etc.

If the corresponding data is not found, on the other hand, then the computer transmits the user ID and an inquiry command to the fax/copier 200 to inquire as to whether the corresponding data is present in the storage device of the fax/copier 200 (S47, S48). If the corresponding data is found in the storage device of the fax/copier 200, the data is acquired (S49) and the user-edited virtual control panel is displayed (S46). If the corresponding data is not found in the storage device of the fax/copier 200 either, then an inquiry as to whether the virtual control panel should be newly edited is sent to the user (S50). If editing is desired, then an editing operation is performed in a manner similar to that shown in FIG. 11 (S51), after which the user-edited virtual control panel is displayed (S46). If editing anew is not desired, then a default virtual control panel possessed by the computer 100 is displayed (S52).

Adopting this arrangement makes it possible for each user to construct his or her own easy-to-use environment.

In addition, managing address data, used for one button dial keys and/or speed dialing, etc., for each user ID, and if a virtual control panel of a certain user ID is retrieved, address data corresponding to the same user ID can be assigned to the buttons of the retrieved virtual control panel.

Further, a batch of operations which the user frequently uses, e.g., a sequence of operations starting from setting a binding margin to 310 mm, setting a document size to A4, enabling frame erase, setting two-page separation mode and setting a 2-side copy mode can be recorded as a macro and assigned to a certain button of a virtual control panel. Managing this user setting macro for each user ID allows setting of individual operation environment for each user.

OTHER EMBODIMENTS

In the foregoing embodiments, the present invention is described using an example in which a fax/copier is employed as the device remotely controlled by the user. However, if the device has a control panel and is capable of being remotely controlled by a user, then the present invention is applicable to such device.

Further, one object of the present invention is realize a virtual control panel that is capable of being manipulated so that there is no disparity between a case where an actual machine is controlled by a user and a case where the machine is controlled by the user remotely from an information processing apparatus. It goes without saying that the scope of the present invention covers not only a virtual control panel having an appearance (positional relationship inclusive of background, size relationship and design) identical with that of the control panel of the actual machine but also a virtual control panel whose layout has been altered somewhat and an instance where only part of the control panel of the actual machine is displayed as the virtual control panel.

Furthermore, it goes without saying that the object of the invention is attained by supplying a storage medium storing the program codes of the software for performing the functions of the foregoing embodiments to the computer 100, reading the program codes by the controller 101 (e.g., a CPU or MPU) from the storage medium, and then executing the program codes.

In this case, the program codes read from the storage medium implement the novel functions of the invention, and the storage medium storing the program codes constitutes the invention.

Further, the storage medium, such as a floppy disk, hard disk, optical disk, magneto-optical disk, CD-ROM, CD-R, magnetic tape, non-volatile type memory card or ROM can be used to provide the program codes.

Furthermore, besides the case where the aforesaid functions according to the embodiments are implemented by executing the program codes read by a computer, it goes without saying that the present invention covers a case where an operating system or the like running on the computer performs a part of or the entire process in accordance with the designation of program codes and implements the functions according to the embodiments.

It goes without saying that the present invention further covers a case where, after the program codes read from the storage medium are written in a function expansion board inserted into the computer or in a memory provided in a function expansion unit connected to the computer, a CPU or the like contained in the function expansion board or function expansion unit performs a part of or the entire process in accordance with the designation of program codes and implements the function of the above embodiment.

Thus, according to the invention, as described above, a remotely controllable apparatus which has a control panel for specifying a processing operation and which is operated in accordance with an indication from the control panel and/or an externally supplied command, or an information processing apparatus that is capable of remotely controlling this apparatus, is provided with storage means for storing control-panel data that represents the appearance of at least principal components of the control panel. This makes it possible to use a virtual control panel, the appearance of which resembles that of the actual control panel, created by utilizing the control-panel data. As a result, it is possible to utilize the virtual control panel without sensing any disparity between an instance where the remotely controllable apparatus is utilized by using the actual control panel and an instance where the apparatus is controlled remotely from an external unit. This affords more user-friendly operation. Since a common control method is adopted, the probability of erroneous operation by the user can be reduced.

Further, my making editing of the virtual control panel feasible, it is possible for each user to create a virtual control panel that is easy for the particular user to use. This makes it possible to realize a remote control system of greater convenience.

Furthermore, in a case where the remotely controllable apparatus is an image processing apparatus having a reading device for reading a document, or a case where an image input device for reading a document and generating image information has been connected to an information processing system, the insertion of a document or the placing of the document on a platen is sensed and the information processing system is so notified, thereby making it possible to utilize the virtual control panel automatically merely by inserting or placing the document. This reduces labor demanded of the user.

As many apparently widely different embodiments of the present invention can be made without departing from the spirit and scope thereof, it is to be understood that the invention is not limited to the specific embodiments thereof except as defined in the appended claims.

What is claimed is:

1. A remote control method for controlling a remotely controllable apparatus from an external device connected to the remotely controllable apparatus, wherein the apparatus has a control panel for specifying a processing operation and a reader for reading an image of a document, and which is operated in accordance with an indication from the control panel and/or an externally supplied command, said method comprising the steps of:

detecting that the document has been set to the reader before said reader starts a reading operation of the document;

in response to detecting the document, causing the external device to display a virtual control panel without any user's instruction after the detecting of the document, the virtual control panel for user interaction to cause the user to instruct the reader to perform a reading operation of the document, with the virtual control panel having an appearance identical with or similar to at least part of the control panel;

generating a command of the remotely controllable apparatus corresponding to an operation of the virtual control panel by the user; and supplying the generated command to the remotely controllable apparatus for causing to start the reading operation of the detected document based on the instruction through the virtual control panel by the user.

2. The method according to claim 1, further comprising the steps of:

inputting a user ID; and providing an edited virtual control panel for each multiple user.

3. A remote control system comprising:

a remotely controllable apparatus which has a control panel for specifying a processing operation and a reader for reading an image of a document, and which is operated in accordance with an indication from said control panel and/or an externally supplied command;

an information processing apparatus capable of supplying a command to said remotely controllable apparatus; and a display unit and input device connected to said information processing apparatus;

wherein said information processing apparatus includes:

detecting means for detecting that the document has been set to said reader before said reader starts a reading operation of the document;

display means for displaying on said display unit, in response to detection by said detecting means, a virtual control panel without any user's instruction after the detecting of the document, the virtual control panel for user interaction to cause the user to instruct the reader to perform a reading operation of the document, with the virtual control panel having an appearance identical with or similar to at least part of the control panel;

discriminating means for establishing correspondence between a command, which operation of the control panel causes to be applied to said remotely controllable apparatus, and an operation performed on the virtual control panel by the user; and communication means for supplying said remotely controllable apparatus for causing to start the reading operation of the detected document based on the instruction through the virtual control panel by the user with the command corresponding to the operation performed on said virtual control panel.

4. The system according to claim 3, wherein the operation is designation of a position.

5. The system according to claim 3, wherein said display means displays said virtual control panel based upon control-panel information obtained from said remotely controllable apparatus.

6. The system according to claim 3, wherein said display means displays said virtual control panel based upon control-panel information possessed by said information processing apparatus.

7. The system according to claim 6, wherein the control-panel information is read out of a recording medium on which it has been recorded in advance and is stored in non-volatile storage means utilizable by said information processing apparatus.

8. The system according to claim 3, wherein said remotely controllable apparatus is an image forming apparatus.

9. The system according to claim 3, wherein said remotely controllable apparatus comprises:

document sensing means for sensing whether or not a document is present in said reader;

wherein when said reader senses that a document is present in said reader, said detecting means detects an output from said document sensing means and said display means displays, on said display unit, said virtual control panel having an appearance identical with or similar to at least part of said control panel.

10. The system according to claim 3, further comprising an image input device connected to said information processing apparatus for reading the image of a document and supplying said information processing apparatus with an image signal representing the image read, said image input device having document sensing means for sensing whether or not the document is present;

wherein when said document sensing means senses that the document is present, said display means displays, on said display unit, said virtual control panel having an appearance identical with or similar to at least part of the control panel.

11. The system according to claim 3, wherein configuration of said virtual control panel is capable of being altered.

12. The system according to claim 3, further comprising:

means for accepting a user ID; and means for editing the virtual control panel for each multiple user.

13. A storage medium storing program code of a remote control method for controlling a remotely controllable apparatus from an external device connected to the remotely controllable apparatus, wherein the apparatus has a control panel for specifying a processing operation and a reader for reading an image of a document, and which is operated in accordance with an indication from the control panel and/or an externally supplied command, comprising:

program code for detecting that the document has been set to the reader before said reader starts a reading operation of the document;

program code for causing the external device, in response to detecting the document, to display a virtual control panel without any user's instruction after the detecting of the document, the virtual control panel for user interaction to cause the user to instruct the reader to perform a reading operation of the document, with the virtual control panel having an appearance identical with or similar to at least part of the control panel;

program code for generating a command of the remotely controllable apparatus corresponding to an operation on the virtual control panel by the user; and program code for supplying the generated command to said remotely controllable apparatus for causing to start the reading operation of the detected document based on the instruction through the virtual control panel by the user.

14. The system according to claim 3, wherein said display means displays, on said display unit, said virtual control panel corresponding to prescribed data that has been entered.

15. The system according to claim 14, wherein said prescribed data is authorization data concerning each user who utilizes said remote control system.

16. The storage medium according to claim 13, further comprising:
program code for inputting a user ID; and
program code for providing an edited virtual control panel for each multiple user.

17. An information processing apparatus in a data processing system which includes: a data processing apparatus which has a control panel for specifying a processing operation and a reader for reading an image of a document, and which is operated in accordance with an indication from the control panel and/or an externally supplied command; the information processing apparatus, which is capable of supplying a command to the data processing apparatus; a display unit and input device connected to the information processing apparatus; and an image input device connected to the information processing apparatus for reading the image of a document and supplying the information processing apparatus with an image signal representing the image read; the information processing apparatus comprising:
detecting means for detecting that a document has been set to the reader before said reader starts a reading operation of the document;
display means for displaying on the display unit, in response to detection by said detecting means, a virtual control panel without any user's instruction after the detecting of the document, the virtual control panel for user interaction to cause the user to instruct the reader to perform a reading operation of the document, with the virtual control panel having an appearance identical with or similar to at least part of the control panel;
discriminating means for establishing correspondence between a command, which operation of the control panel causes to be applied to the data processing apparatus, and an operation performed on the virtual control panel by the user; and
communication means for supplying the data processing apparatus for causing to start the reading operation of the detected document based on the instruction through the virtual control panel by the user with the command corresponding to the operation performed on the virtual control panel.

18. The apparatus according to claim 17, wherein said display means displays, on the display unit, the virtual control panel corresponding to prescribed data that has been entered.

19. The apparatus according to claim 18, wherein said prescribed data is authorization data concerning each user who utilizes said data processing system.

20. The apparatus according to claim 17, further comprising:
means for accepting a user ID; and
means for editing the virtual control panel for each multiple user.

21. A method of controlling an information processing apparatus in a data processing system which includes: a data processing apparatus which has a control panel for specifying a processing operation and a reader for reading an image of a document, and which is operated in accordance with an indication from the control panel and/or an externally supplied command; the information processing apparatus, which is capable of supplying a command to the data processing apparatus; a display unit and input device connected to the information processing apparatus; and an image input device connected to the information processing apparatus for reading the image of a document and supplying the information processing apparatus with an image signal representing the image read; said method comprising the steps of:
detecting that a document has been set to said reader before said reader starts a reading operation of the document;
in response to detecting the document, displaying, on the display unit, a virtual control panel without any user's instruction after the detecting of the document, the virtual control panel for user interaction to cause the user to instruct the reader to perform a reading operation of the document, with the virtual control panel having an appearance identical with or similar to at least part of the control panel;
a discriminating step of establishing correspondence between a command, which operation of the control panel causes to be applied to the data processing apparatus, and an operation performed on the virtual control panel by the user; and
a communication step of supplying said data processing apparatus for causing to start the reading operation of the detected document based on the instruction through the virtual control panel by the user with the command corresponding to the operation performed on said virtual control panel.

22. The method according to claim 21, wherein said display step displays, on said display unit, said virtual control panel corresponding to prescribed data that has been entered.

23. The method according to claim 22, wherein said prescribed data is authorization data concerning each user who utilizes said data processing system.

24. The method according to claim 21, further comprising the steps of:
inputting a user ID; and
providing an edited virtual control panel for each multiple user.

25. A storage medium storing program code of a method of controlling an information processing apparatus in a data processing system which includes: a data processing apparatus which has a control panel for specifying a processing operation and a reader for reading an image of a document, and which is operated in accordance with an indication from the control panel and/or an externally supplied command; the information processing apparatus, which is capable of supplying a command to the data processing apparatus; a display unit and input device connected to the information processing apparatus; and an image input device connected to the information processing apparatus for reading the image of a document and supplying the information processing apparatus with an image signal representing the image read; comprising:
program code for detecting that the document has been set to said reader before said reader starts a reading operation of the document;
program code for displaying on the display unit, in response to the detection of the document, a virtual control panel without any user's instruction after the detecting of the document, the virtual control panel for user interaction to cause the user to instruct the reader to perform a reading operation of the document, with the virtual control panel having an appearance identical with or similar to at least part of the control panel;

program code for establishing correspondence between a command, which operation of the control panel causes to be applied to said data processing apparatus, and an operation performed on the virtual control panel by the user; and program code for supplying said data processing apparatus for causing to start the reading operation of the detected document based on the instruction through the virtual control panel by the user with the command corresponding to the operation performed on said virtual control panel.

26. The storage medium according to claim 25, further comprising:

program code for inputting a user ID; and program code for providing an edited virtual control panel for each multiple user.

* * * * *

UNITED STATES PATENT AND TRADEMARK OFFICE
CERTIFICATE OF CORRECTION

| | | |
|---|---|---|
| PATENT NO. | : 7,051,281 B1 | Page 1 of 1 |
| APPLICATION NO. | : 09/388373 | |
| DATED | : May 23, 2006 | |
| INVENTOR(S) | : Masahiko Yokota | |

It is certified that error appears in the above-identified patent and that said Letters Patent is hereby corrected as shown below:

COLUMN 11:

Line 38, "is" should read --is to--.

COLUMN 12:

Line 37, "my" should read --by--.

Signed and Sealed this

Twentieth Day of November, 2007

JON W. DUDAS
*Director of the United States Patent and Trademark Office*